United States Patent
Benezech et al.

(10) Patent No.: US 12,264,628 B2
(45) Date of Patent: Apr. 1, 2025

(54) FUEL SUPPLY SYSTEM WITH AIR EXPULSION DRAIN FOR AN AIRCRAFT ENGINE

(71) Applicant: SAFRAN HELICOPTER ENGINES, Bordes (FR)

(72) Inventors: Philippe Jean René Marie Benezech, Moissy-Cramayel (FR); Alexis Thomas Valentin Longin, Moissy-Cramayel (FR); Pierre Anthony Sicaire, Moissy-Cramayel (FR); Gabriel Darrieumerlou, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/287,745

(22) PCT Filed: Apr. 13, 2022

(86) PCT No.: PCT/FR2022/050698
§ 371 (c)(1),
(2) Date: Oct. 20, 2023

(87) PCT Pub. No.: WO2022/223907
PCT Pub. Date: Oct. 27, 2022

(65) Prior Publication Data
US 2024/0183314 A1 Jun. 6, 2024

(30) Foreign Application Priority Data
Apr. 21, 2021 (FR) ...................................... 2104169

(51) Int. Cl.
*F02C 7/236* (2006.01)
*F02C 7/232* (2006.01)
*F02C 7/32* (2006.01)

(52) U.S. Cl.
CPC .............. *F02C 7/236* (2013.01); *F02C 7/232* (2013.01); *F02C 7/32* (2013.01)

(58) Field of Classification Search
CPC .. F02C 7/22; F02C 7/222; F02C 7/232; F02C 7/236; F23K 2900/05082; B64D 37/00; B64D 37/005; B64D 37/32
See application file for complete search history.

(56) References Cited

U.S. PATENT DOCUMENTS 2,469,917 A * 5/1949 Curtis .................... B64D 37/34
                                                      95/254
3,948,626 A * 4/1976 Bragg .................... B64D 37/32
                                                      96/372

(Continued)

OTHER PUBLICATIONS

Search Report dated Dec. 6, 2021 in French Application No. FR 2104169.

(Continued)

*Primary Examiner* — Alain Chau
(74) *Attorney, Agent, or Firm* — Sughrue Mion, PLLC (57) ABSTRACT

A liquid fuel supply system for an aircraft engine includes a fuel tank, a suction duct connected to the fuel tank and located higher than the fuel tank, an electric pump, a supply pump that is mechanically driven by an accessory gear box and an outlet of the supply pump being connected to a fuel supply circuit of the engine, and an air expulsion drain. The electric pump is in communication with the suction duct independently of the supply pump, the electric pump is in communication with the air expulsion drain, and the supply pump is in communication with the suction duct independently of the electric pump.

14 Claims, 5 Drawing Sheets

(56) References Cited

U.S. PATENT DOCUMENTS

| | | | | |
|---|---|---|---|---|
| 4,691,510 | A * | 9/1987 | Taylor | B01D 19/0057 |
| | | | | 60/734 |
| 4,883,410 | A * | 11/1989 | Goddard | F02M 37/20 |
| | | | | 417/89 |
| 7,569,099 | B2 * | 8/2009 | Coffin | B01D 19/0031 |
| | | | | 210/640 |
| 9,206,775 | B2 * | 12/2015 | Ripley | F02M 37/0052 |
| 9,885,287 | B2 * | 2/2018 | Striker | F02C 7/224 |
| 10,883,423 | B2 * | 1/2021 | Rhoden | B01D 53/22 |
| 10,994,226 | B2 * | 5/2021 | Cordatos | B01D 19/0026 |
| 2010/0293919 | A1 * | 11/2010 | Poisson | F01D 19/00 |
| | | | | 60/734 |
| 2012/0111417 | A1 * | 5/2012 | Smith | B64D 37/14 |
| | | | | 137/565.01 |
| 2013/0192244 | A1 | 8/2013 | Ripley et al. | |
| 2014/0150440 | A1 | 6/2014 | Suciu et al. | |
| 2016/0076452 | A1 * | 3/2016 | Striker | F02C 7/224 |
| | | | | 60/734 |
| 2016/0186671 | A1 * | 6/2016 | Austin | F02C 3/24 |
| | | | | 60/737 |
| 2016/0252051 | A1 * | 9/2016 | Smith | F02M 37/20 |
| | | | | 244/17.11 |
| 2017/0368496 | A1 * | 12/2017 | Rheaume | B01D 17/02 |
| 2018/0318730 | A1 * | 11/2018 | Rheaume | B01D 19/00 |
| 2019/0023411 | A1 * | 1/2019 | Welch | F04D 13/12 |
| 2019/0120142 | A1 * | 4/2019 | Rhoden | B01D 53/22 |
| 2020/0086239 | A1 * | 3/2020 | Cordatos | B01D 19/0021 |
| 2020/0300169 | A1 | 9/2020 | Turney | |
| 2021/0079848 | A1 * | 3/2021 | Cocks | F02C 7/236 |
| 2021/0102517 | A1 * | 4/2021 | Susca | F02C 7/26 |
| 2022/0033099 | A1 * | 2/2022 | Massie | A62C 3/065 |
| 2022/0040631 | A1 * | 2/2022 | Henninger | B01D 53/8671 |

OTHER PUBLICATIONS

International Search Report dated Jul. 12, 2022 in Application No. PCT/FR2022/050698.

* cited by examiner

FUEL SUPPLY SYSTEM WITH AIR EXPULSION DRAIN FOR AN AIRCRAFT ENGINE

This Application is a National Stage of International Application No. PCT/FR2022/050698 filed Apr. 13, 2022, claiming priority based on French Patent Application No. 2104169 filed Apr. 21, 2021, the contents of each of which being herein incorporated by reference in their entireties.

FIELD OF THE INVENTION

The invention relates to the fuel circuits of aircraft engines. It particularly relates to the fuel supply of helicopter turboshaft engines.

PRIOR ART

In the fuel circuit of an aircraft gas turbine engine, the generation of flow rate is generally provided for a so-called "high-pressure" (HP) volumetric pump, driven by the rotor of the gas turbine engine via an accessory gear box, in other words via a gear train driven by an engine shaft of the gas turbine engine. The rotor itself is set to rotate by the combustion of the fuel. Provision can also be made for a so-called "low-pressure" (LP) centrifugal pump upstream of the volumetric pump in order to guarantee sufficient pressure at the inlet of the latter and thus avoid cavitation phenomena.

On certain aircraft, conventionally helicopters, the engines are mounted in the upper part of the aircraft whereas the fuel tanks are located in its lower part.

The proper operation of the fuel circuit of the engine is only guaranteed if there is liquid fuel at the inlet of the high-pressure pump. However, at start-up or restart, the presence of air of fuel vapor is possible in this circuit.

For example, after a maintenance operation that has led to the removal or installation of the engine or of an item of equipment of the fuel circuit, the presence of air can be noted at the next first restart. Similarly, an air intake when the engine is stopped can occur at the dynamic or semi-dynamic seals or the valves. Here again, the presence of air is noted at the first restart of the engine in the morning. The presence of steam, meanwhile, may be the result of fuel vaporization on re-starting a hot engine in the presence of a volatile fuel. The presence of air or of a vapor phase in the fuel circuit prevents, delays or may interrupt the fuel supply during start-up, compromising the success thereof.

To remedy this, it is known to use one or more pumping members, generally electrical, located in the fuel tank, aiming to promote the supply of fuel by compressing any air bubbles. Similarly, in the presence of such pumping systems on the tank side, a drain closing member, in the engine, connected to a return channel toward the tank is currently used to expel the air before engine start-up.

However aircraft manufacturers may wish to dispense with making provision for a pumping member at the tank even if the fuel column running from the tank to the engine risks being initially empty. This application is formulated specifically for small and medium engines. In other words, the engines must be self-priming. Aircraft manufacturers may also wish to dispense with a return duct toward the tank.

An aim of the invention is therefore to dispense with a pumping member in the fuel tank, or also with a return duct to the tank.

SUMMARY OF THE INVENTION

For this purpose, provision is made according to the invention for a liquid fuel supply system for an aircraft engine, the system comprising:

a fuel tank,
a suction duct connected to the tank and located higher than the tank,
an electric pump,
a supply pump configured to be mechanically driven by an accessory gear box and be connected at the outlet to a fuel supply circuit of the engine, and
an air expulsion drain,
the electric pump being in communication with the suction duct independently of the supply pump, and with the drain, the supply pump being in communication with the suction duct independently of the electric pump.

Thus, the electric pump is able to expel any gas located in the fuel circuit, upstream of the supply pump. This electric pump is driven by an electric motor independent of the rotation of the gearings of the accessory gear box driven by the rotation of the high-pressure (HP) shaft of the gas turbine engine. It can therefore in particular be actuated before the start-up of the gas turbine engine, so that the fuel pumped by the supply pump at start-up is free of gas bubbles. Under these conditions, it is no longer necessary to make provision for a pump in the tank itself to expel the gas before the start-up of the gas turbine engine. Note that the device, once the air has been expelled, does not discharge any liquid to the drain.

The invention allows a mass saving in the aircraft. It reduces the risks of false starts or related to maintenance operations. It requires a hydraulic connection at two points of the fuel circuit but without generating any stresses on the latter and particularly on its pumps. This solution also dispenses with design limitations that are usually applicable to the low-pressure pump, if one is present, and to certain hydromechanical units (HMU). The invention can be easily adapted to existing engines. This drain device does not necessarily require power electronics. The drain remains dry. It can also be seen that, owing to the arrangement of the invention, the electric pump is segregated from the main fuel circuit and thus cannot disrupt the latter. The invention dispenses with the need to vent the engine after a maintenance operation to recondition the fuel circuit.

It is known that the supply circuit, in the case of a helicopter, comprises, from upstream to downstream with reference to the stream of fuel, a tank, a low-pressure pump, a filter and a high-pressure pump, the tank being located higher than the filter. The electric pump may then be adjoined to the main filter to form a single unit. When provision is thus made for a low-pressure pump upstream of the filter, this will be preferably (or even necessarily) a centrifugal pump: this pump, even stopped, must be liquid-permeable to allow the electric pump to suction the fuel from the tank. Conversely, a volumetric pump (for example with gears) stopped is virtually impermeable to liquid.

The invention may moreover have at least one of the following features:
the suction duct is connected to the tank by means of a duct which extends continuously up from the tank;
the system comprises an air/liquid separation chamber disposed fluidly in series between an outlet of the electric pump and the drain;
a valve with a hydraulic fuse function is disposed fluidly in series between an outlet of the air/liquid separation chamber and the drain, the valve being configured to close when liquid fuel enters the valve;
the valve is configured to close when a pressure difference between an upstream end of the valve, with reference to a direction of a stream of fuel through the system, and a downstream end of the valve is greater than a given threshold;

the system comprises a closing member extending in a duct forming a bypass with respect to the electric pump, the closing member being configured to allow communication when the electric pump is subject to a pressure difference which exceeds a given threshold;

the system comprises a checking device configured such that no gas or liquid can enter into the electric pump from a duct located downstream of the electric pump, with reference to a direction of a stream of fuel through the system, when the electric pump is stopped, the device being for example separated from the valve or incorporated into the valve;

the electric pump is located at the highest point of a part of the fuel circuit extending upstream of the supply pump with reference to a direction of a stream of fuel through the system; and the supply pump forming a first supply pump, the system comprises a second supply pump extending upstream of the electric pump with reference to a direction of a stream of fuel through the system.

Provision is also made according to the invention for an aircraft comprising an engine, such as a gas turbine engine, configured to be supplied with fuel by a system according to the invention, the engine comprising a high-pressure shaft configured to be rotationally driven by the combustion of the fuel and to drive the supply pump.

This can for example be a rotary wing aircraft.

Provision is finally made according to the invention for a method for supplying fuel to an aircraft engine, a method wherein:

independently of a fuel supply pump of the engine, an electric pump of the engine pumps fuel from a tank located on board the aircraft and expels gas through a drain, and independently of the electric pump, the supply pump pumps fuel from the tank and supplies the engine.

DESCRIPTION OF THE FIGURES

We will now set out embodiments of the invention by way of non-limiting example with reference to the drawings wherein.

Figure 1:
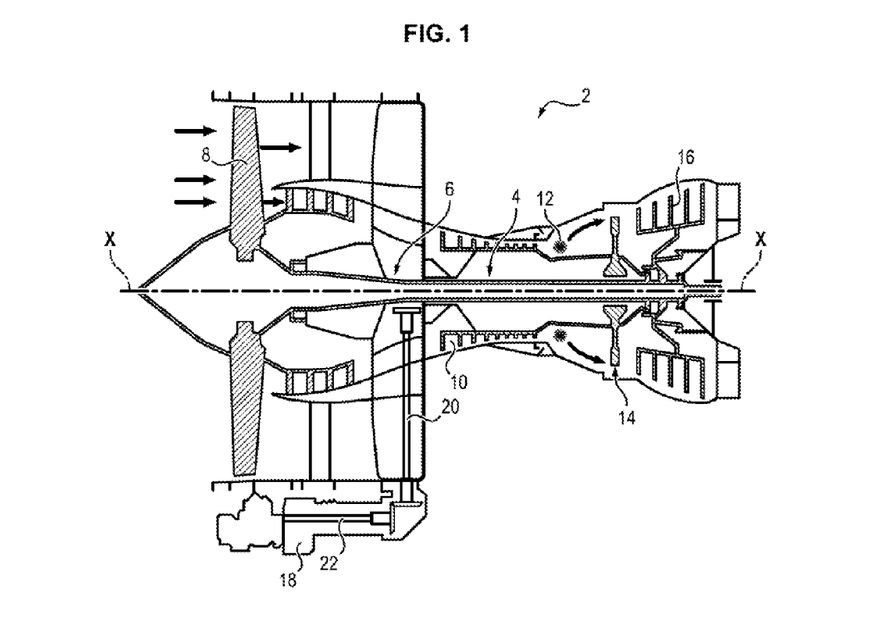
FIG. 1 is an axial section view of an aircraft turbojet engine according to an embodiment of the invention.

FIG. 1 illustrates an aircraft turbojet engine 2 according to an embodiment of the invention, here twin spool. It extends around a main longitudinal axis X-X. It comprises a high-pressure shaft 4 and a low-pressure shaft 6. It includes from left to right, i.e. from upstream to downstream with reference to the stream of gas flowing through the main flow path in operation in the gas turbine engine: a fan 8, a high-pressure compressor 10, a combustion chamber 12, a high-pressure turbine 14 and a low-pressure turbine 16.

The high-pressure shaft 4 is configured to be rotationally driven by the combustion of a fuel.

The turbojet engine comprises a radial shaft 20 in engagement with the high-pressure shaft 4 in a manner known per se in order to be rotationally driven by the latter.

Figure 2:
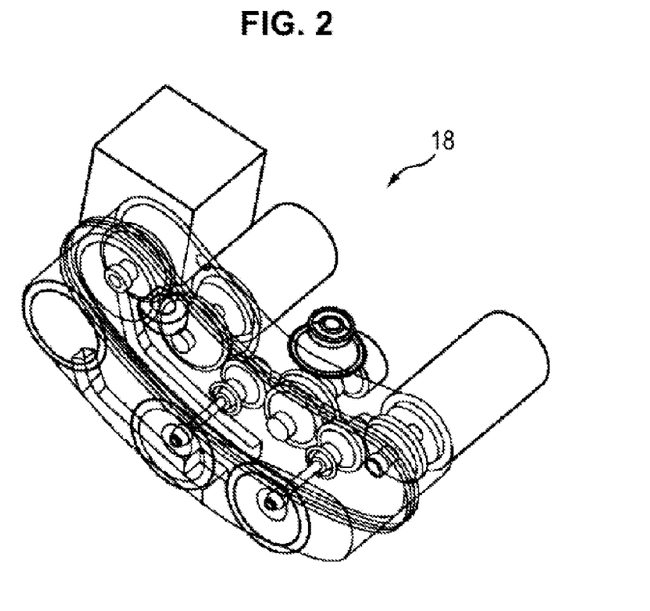
FIG. 2 is a perspective view of the accessory gear box of the turbojet engine of FIG. 1.

It also comprises an accessory gear box 18 illustrated in FIG. 2 with certain equipment items in place. The box includes a transfer shaft 22, parallel to the main axis X-X, remote from the latter, and rotationally driven by the radial shaft 20. From the power connector at the engine core and by way of the radial shaft 20 and of the transfer shaft 22, the accessory gear box 18 drives and supports in a manner known per se equipment items such as fuel pumps, electric generators, a lubrication unit, a starter, a degreaser and other members which together form all the ancillary equipment of the engine and for aircraft power generation.

Below is a description of the fuel supply circuit of the turbojet engine and in particular the members of this circuit, some of which are carried by the accessory gear box 18.

The circuit comprises a suction duct 24 (FIG. 4), a drain 26 (FIG. 5) and a downstream supply duct forming an outlet 28 (FIG. 4), each opening onto the outside of the box.

It also comprises in this case a low-pressure supply pump 30 and a high-pressure supply pump 32. These two pumps are rotationally driven by the axial secondary rotor 22 in a manner known per se and which will not be detailed.

The circuit also comprises a priming device 34 particularly comprises an electric pump 36 serving to prime the pumping of the fuel.

Figure 4:
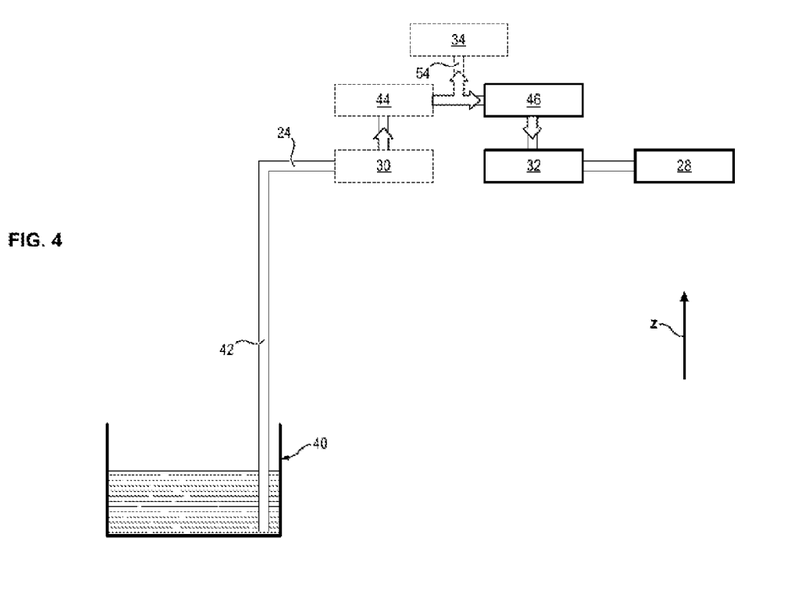

The aircraft is also equipped with at least one fuel tank 40 located outside the gas turbine engine and illustrated in FIG. 4.

Figure 3:
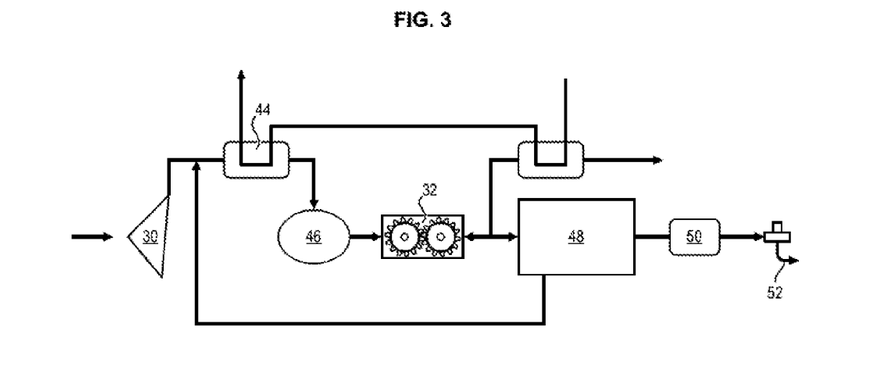
FIGS. 3 and 4 illustrate the fuel circuit of the engine of FIG. 1.

The main arrangement of the fuel circuit is illustrated in FIGS. 3 and 4. The low-pressure pump 30 is in communication with the tank 40 by means of a duct 42 through the duct 24. The duct 42 extends continuously up from the tank.

It thus ensures a first pressure rise of the fuel in the circuit. It sends the fuel into a reheater 44 (the fuel being heated by the oil) then into a filter 46 and finally into the high-pressure pump 32. The latter sends the fuel into a regulator 48 which forms a fuel metering unit, then through a flow distributing member 50 for the injectors, and finally all the way to the injectors 52 of the turbojet engine. The following members are therefore arranged in series in this circuit in this order from upstream to downstream with reference to the direction of flow of the fuel through the circuit: the low-pressure pump 30, the reheater 44, the filter 46, the high-pressure pump 32, the regulator 48, the distributing member 50 and the injectors 52. The regulator 48 is also connected by a return duct to the fuel circuit upstream of the reheater 44 in order to return into the circuit the excess of pumped fuel. In a variant, the return may also be done downstream of the reheater.

The priming device 34 is connected to the reheater 44, downstream of the latter, by a bypass duct 54 thus branching off the duct leading from the reheater 44 to the filter 46. It is above all a case of connecting the priming device 34 to a high point upstream of the high-pressure pump 32; in FIG. 5 the device is connected to a high point in the filter block upstream of the filtering medium.

Figure 5:
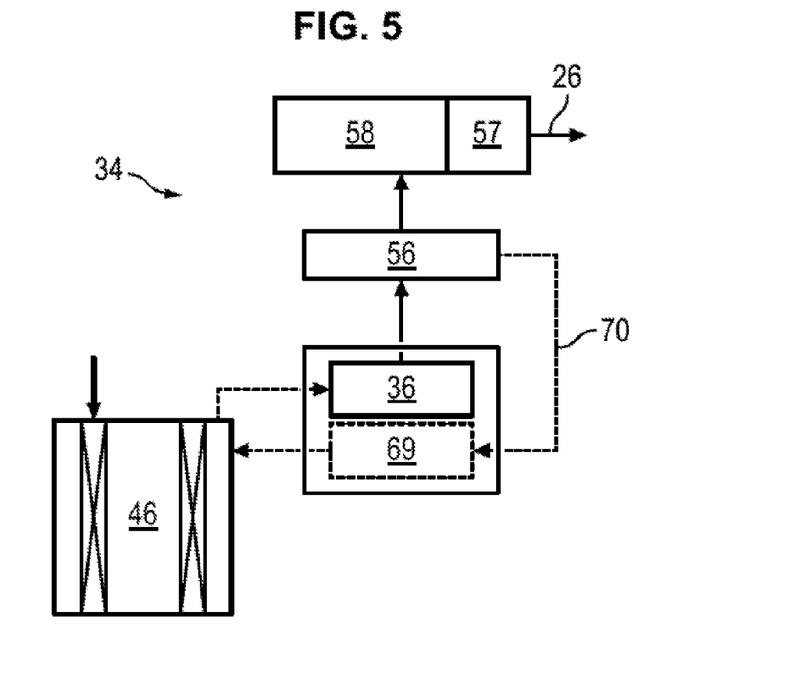
FIG. 5 is a detail view of a part of the circuit of the previous figure.

The priming device 34 is therefore then located downstream of the reheater 44. The same applies for the filter 46. However the device and the filter are not downstream of one another.

It can also be seen that the low-pressure pump 30 is located upstream of the electric pump 36. It is in communication with the duct 24 independently of the electric pump 36. The same applies for the high-pressure pump 32. The low-pressure and high-pressure pumps are configured to be rotationally driven by the accessory gear box 18.

Below is a detailed description of the priming device 34 with reference to FIG. 5.

The priming device 34 is in communication with an inlet upstream of the filter 46.

The electric pump 36 is here a small volumetric pump, also known as a micropump. The electric pump is located at the highest point of a part of the fuel circuit extending upstream of the high-pressure pump 32.

The device comprises an air/fuel separation chamber 56 downstream of the electric pump 36. This may be a chamber operating by gravity and/or by cyclonic effect.

It can therefore be seen that the electric pump 36 is in communication with the duct 24 and with the drain 26, each time independently of the low-pressure and high-pressure pumps. The pump 36 is preferably located at a local low point making it possible to keep it "wet" even in the event of air intake, whatever its origin. Specifically, a wet pump generally has better performance in air than a dry pump.

The air/fuel separation chamber 56 has the function of separating the air and fuel in such a way as to:
  expel, as a priority, the air in the direction of the drain, and
  convey, as a priority, the fuel to the pumping member. If, in the air pumping phase, the pump dries out by expelling fuel downstream, the air/fuel separation chamber makes it possible to bring back liquid under gravity toward the pump.

The separation chamber thus makes it possible to meet certain recommendations:
  entry of the pumping member at the low point;
  exit toward the drain at the high point on a different axis from the entry;
  low average speed allowing air/fuel separation, for example less than 1 m/s.

The total volume of the channel downstream of the pump 36 and of the separation chamber 56 must be greater than or equal to the volume necessary to submerge the pumping member.

The priming device 34 comprises a valve 58 with a hydraulic fuse function fluidly disposed in series between an outlet of the air/fuel separation chamber 56 and the drain 26. The valve is configured to close when a pressure difference between an upstream end and a downstream end of the valve is greater than a predetermined threshold.

Such a valve is known per se and can be arranged in different ways. Its operating principle is illustrated for example with reference to the structure of FIG. 6. This valve here comprises a body 60 and an annular member 62 mounted slidably in the body and including a central passage for the fluid. This passage 62 thus forms a movable orifice of the valve at a first opening of the latter. The valve also comprises a finger 64, a rear end of which is rigidly attached to one end of the body and the other end of which, free, is oriented in the direction of the member 62. A spring 66 bears on the rear end of the finger on the one hand and on the sliding member 62 on the other hand in such a way as to move the latter away from the finger. The valve comprises a lateral opening 67 extending opposite the spring and the finger. This opening is in communication downstream with the drain 26.

Figure 6:
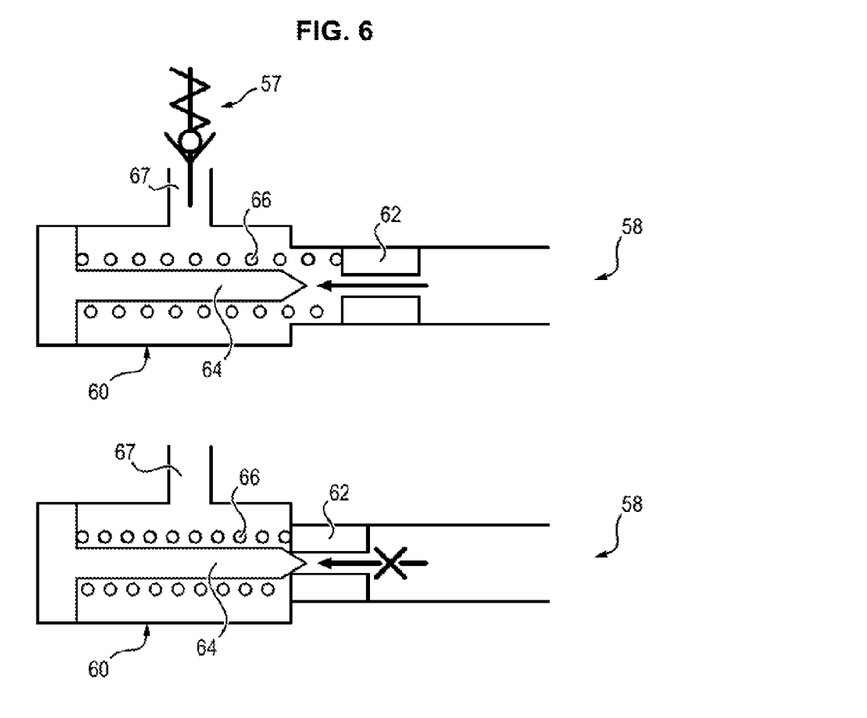
FIG. 6 shows two views illustrating the operation of the valve of the circuit of the preceding figure.

The difference is considered between the upstream external pressure exerted on the sliding member 62 and the downstream external pressure exerted on the lateral opening 67.

The through configuration of the valve is illustrated in the first view of FIG. 6. The sliding member 62 is kept away from the end of the finger 64 by the spring 66 such that fluid may enter into the valve through the sliding member and exit from it via the lateral opening 67. The fluid therefore passes from upstream to downstream through the valve. When the through fluid is a gas, for example a mixture of air and fuel vapor flushed by the electric pump 36, its passage through the sliding member 62 generates virtually no load loss between upstream and downstream of the sliding member 62, so that the valve remains in its through configuration.

When a significant quantity of essentially liquid fuel reaches the valve 58, meaning that the liquid fuel is brought up from the tank to the outlet of the electric pump 36 by flushing the air through the valve, the load losses of the liquid passing between upstream and downstream of the valve are such that a force is created on the sliding member 62. This force tends to displace the sliding member 62 against the action of the spring 66 until it abuts the finger 64. The end of the finger then obstructs the orifice of the central passage of the member 62 and thus blocks the liquid flow. The valve is then in a non-through configuration as illustrated in the second view of FIG. 6.

The valve therefore has a hydraulic fuse function reacting to the passage of a liquid. It closes when a significant flow of liquid fuel appears in the valve. The threshold of the valve, determined in particular by the diameter of the orifice of the central passage of the member 62 and by the setting of the spring 66, is chosen such that the electric pump 36 is capable of flushing air through the check valve (see below) without locking the valve. When fuel enters the electric pump, due to the different densities between air and fuel, the same volumetric flow generated by the electric pump locks the valve. The latter therefore distinguishes between air and fuel. It avoids the discharging of liquid fuel into the drain after the expulsion of the air, without the need for a detecting member to do this.

The priming device 34 also includes a closing member 57, for example of ball and spring type, providing a checking function. Thus, it is configured such that no gas or liquid can enter the electric pump 36 from a duct located downstream thereof when it is stopped. The valve 58 and the closing member 57 form a distributing member. The closing member may be incorporated into the valve as a function of the architecture chosen for the latter.

This closing member is particularly useful due to the depressurization that the fuel in the duct 42 may generate all the way to the priming device 34. The device 34 must specifically be sealed below the setting of the spring 66, on a helicopter in any case. When the engine is stopped, the pressure at the inlet of the closing member is generally less than the PO, PO being the manometric height related to the difference in height with respect to the tank of the helicopter.

The device 34 may also include an overpressure closing member 69 extending in a duct 70 forming a bypass with respect to the electric pump 36. The bypass duct therefore extends from the separation chamber 56 all the way to the upstream inlet of the filter 46, fluidly parallel to the duct comprising the electric pump 36. The closing member 69 is configured to allow communication when the electric pump 36 is subjected to a pressure difference which exceeds a predetermined threshold. It therefore makes it possible, if necessary, to limit the pressure once the valve is locked. It is optional.

The method of the invention can be implemented for example as follows.

It is assumed that the turbojet engine is stopped and has not started yet.

The electric pump 36 is started. This does not require the starting of the turbojet engine.

The electric pump 36 first pumps gas located in the duct 42 connecting it to the tank, since if gas is found there it is located at least at the top of the duct 42 all the way to the junction between the duct and the suction duct 24. The gas thus pumped traverses the low-pressure pump 30, the reheater 44, then the electric pump 36, the separation chamber 56 and finally the valve 58 and the closing member 57 to be evacuated by the drain 26.

The gas is pumped as a priority. When there is no longer any gas, it is liquid fuel which is pumped until it enters the valve 58 where it generates a pressure increase at the inlet of the valve which causes it to close.

The electric pump 36 is then stopped, since the fuel supply circuit is then primed due to it being filled virtually all the way to the filter 46. It can therefore be seen that, independently of the low-pressure and high-pressure pumps, the electric pump pumps the fuel from the tank.

The turbojet engine (or turboshaft engine) is then started to set the high-pressure shaft 4 in rotation. The low-pressure and high-pressure pumps pump the fuel from the tank to supply the injectors of the gas turbine engine, and do so independently of the electric pump.

One is thus dealing with an electric pump for the priming of the fuel circuit, which expels air but not fuel. The drain remains dry owing to the valve 58.

Another embodiment of the valve 58' is illustrated in FIGS. 7A-C and 8. It is usable when the aircraft is a helicopter, for example. This time, the checking function is incorporated into the valve.

The valve 58' comprises a cylinder 80 having a front opening 82 and a rear opening 84. The fuel supply duct 86 connected to the separation chamber 56 includes a branch such that it communicates on the one hand with the front opening 82 and on the other hand with the rear opening 84. A restriction 88 or nozzle is interposed between the branch and the front opening 82.

A piston 90 is mounted movably by sliding in the cylinder 80 in which it delimits a front chamber 92 able to communicate with the front opening 82 when the valve 98 is open and a rear chamber 94 communicating with the rear opening 84. The drain 26 also opens laterally into the front chamber 92.

The piston 90 is recalled by a spring 96 with a high setting toward the rear opening 84, the spring bearing on the one hand against the front end of the cylinder 80 and on the other hand against a shoulder of the piston. The spring 96 is for example chosen such that the piston 90 travels toward the front of the cylinder when it is subjected to a pressure difference of at least 100 kPa. It is the bringing of the valve 98 to the abutment which stops the forward displacement of the assembly.

Figure 8:
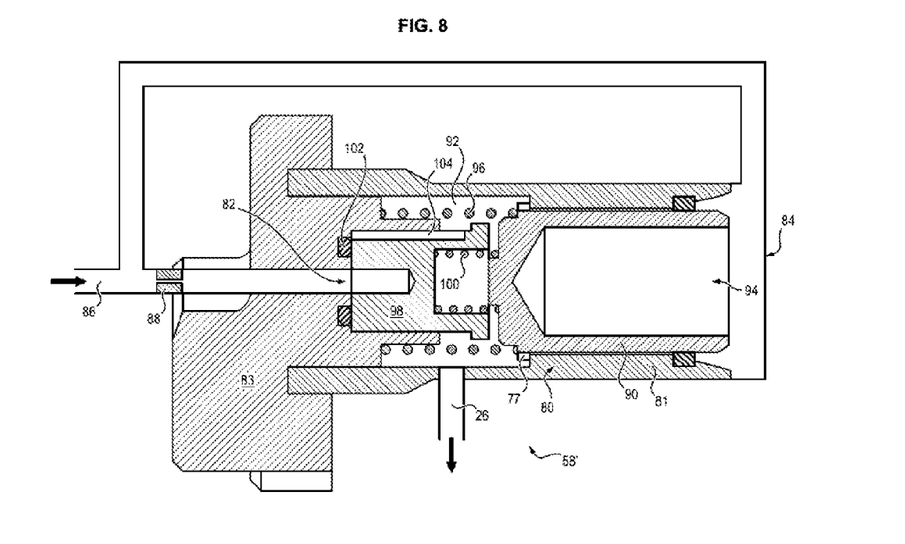
FIG. 8 is an axial section view of a detailed exemplary embodiment of such a valve.

The valve is arranged such that the rear opening 84 is never shut: this is because it is necessary for the surface S of the piston 90 in the rear chamber 94 on which the pressure of the fluid is exerted to remain constant so that the force F=P×S depends only on the pressure P. A minimal distance will therefore be kept between the piston 90 and the bottom of the rear chamber 94, which is obtained here by a stop 77 formed by a front annular shoulder of the piston bearing against a shoulder of the cylinder 80, as illustrated in FIG. 8.

The piston 90 bears at its front end a valve 98 mounted movably by sliding in the piston and restored in the direction of the front end of the cylinder by spring 100 with low setting. The setting of the first spring 96 is higher than that of the second. The spring 100 with low setting is chosen such that the valve 98 opens when it is subjected to a pressure difference of at least 15 kPa.

Figure 7A:
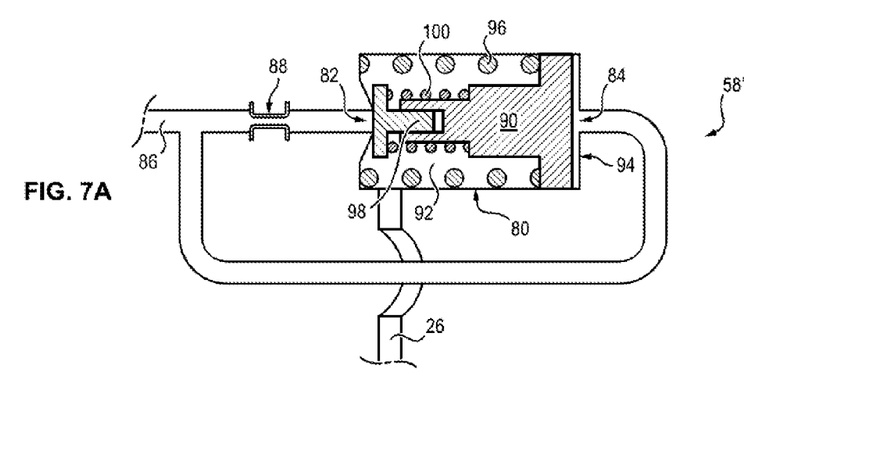
FIGS. 7A to 7C illustrate three steps in the operation of a valve in another embodiment.

FIG. 7A illustrates the first position and corresponds to a stopped situation in which the priming micropump 36 is not activated. The pressure of the fluid at the intake of the micropump being then substantially equal to the (atmospheric) pressure in the drain 26, the pressure difference exerted on the valve 58' is virtually zero. The valve therefore remains closed. The piston 90 is bearing on the shoulder of the cylinder, without shutting off the rear opening 84. The valve 98 is meanwhile bearing against the front end of the cylinder, such that the front opening 82 is shut off and the drain 26 thus does not communicate with the duct 86. The engine is stopped and the pressure at the inlet of the valve is generally less than the PO, namely the manometric height related to the difference in height with respect to the helicopter tank.

Figure 7B:
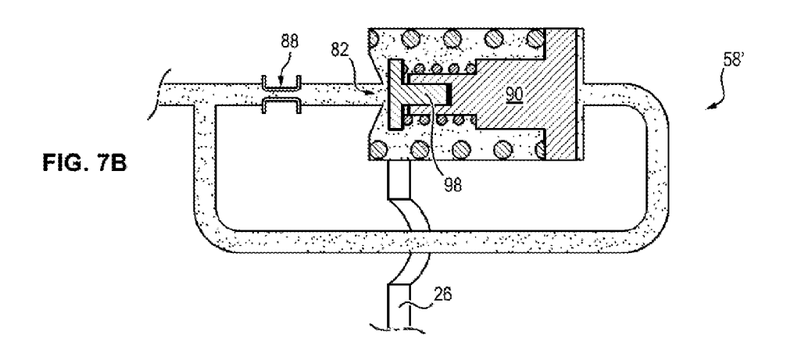

In FIG. 7B, the second position corresponds to a situation in which the micropump 36 is activated and the fluid at the inlet is essentially gaseous. The pressure of the gas discharged by the pump is sufficient to open the front opening 82 of the valve in spite of the presence of the restriction 88: the valve 98 moves to the right against the action of its spring 100. At the same time, the gas pressure is inadequate for the gas present in the chamber 94 on the right to push the piston 90 to the left, the force of the spring 96 of the piston being predominant. The front opening 82 of the valve therefore remains open and the gas can be expelled into the drain 26.

Figure 7C:
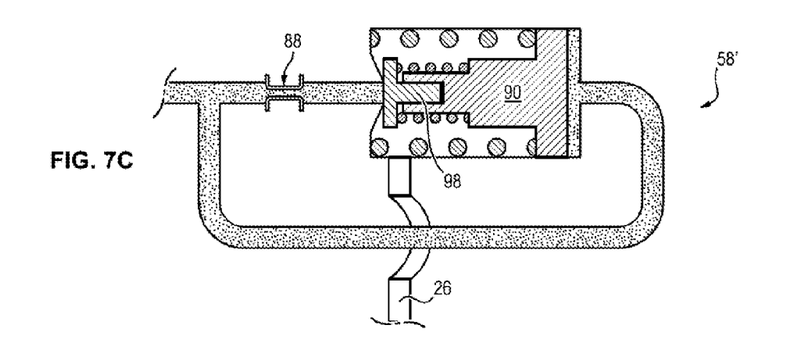

Finally, in FIG. 7C, the third position corresponds to a situation where the micropump 36 is activated and the fluid at the inlet is essentially liquid. Due to the presence of the restriction 88, the pressure of the fluid in the front chamber 92 is less than that of the fluid in the rear chamber 94. Since the spring 96 is set such that the pressure difference exerted on the piston 90 is then predominant with respect to the force of the spring, the piston 90 is pushed back to the left, driving with it the valve 98 until the latter bears against its seat while compressing the spring 100, thus closing the front opening 82 of the valve. The drain 26 thus does not communicate again with the inlet duct 86.

This valve 58' is therefore automatically locked by the fuel and automatically unlocked by air.

A detailed exemplary embodiment of this valve is illustrated in FIG. 8. The valve 98 then bears to the left against an O-ring 102 in the closed position. The passing of the air all the way to the drain, when the valve is open, is done via an outer longitudinal groove 104 made in the cylindrical body of the valve. The cylinder 80 is here formed in two parts 81, 83, namely a part 81 on the right in FIG. 8 surrounding the piston 90 and a part 83 on the left which surrounds the front of the valve 98.

It is beneficial to apply the invention to a rotary wing aircraft such as a helicopter. In this case, it is advantageous to place the electric pump 36 at the highest point of a fuel circuit of the aircraft, as illustrated in FIG. 4.

Of course, many modifications may be made to the invention without departing from the scope thereof.

The invention is also applicable to other types of aircraft engine, for example thermal piston engines of small helicopters.

The low-pressure pump 30 and the reheater 44 are not indispensable. One could dispense with any of the two or both at once. If both are dispensed with, the duct 24 of the supply system is located just upstream of the junction between the main filter and the priming device 34.

The invention claimed is:

1. A liquid fuel supply system for an aircraft engine, the liquid fuel supply system comprising:
    a fuel tank;
    a suction duct connected to the fuel tank and located higher than the fuel tank;
    an electric pump;
    a first supply pump configured to be mechanically driven by an accessory gear box and to be connected at an outlet of the first supply pump to a fuel supply circuit of the aircraft engine;
    a second supply pump extending upstream of the electric pump with reference to a direction of a stream of fuel through the liquid fuel supply system, and
    an air expulsion drain,
    wherein the electric pump is in communication with the suction duct independently of the first supply pump,
    the electric pump is in communication with the air expulsion drain, and
    the first supply pump is in communication with the suction duct independently of the electric pump,
    prior to a starting of the aircraft engine, the system electric pump pumps fuel through the second supply pump when the aircraft engine and the first supply pump are stopped.

2. The liquid fuel supply system according to claim 1, wherein the suction duct is connected to the fuel tank by a duct extending continuously up from the fuel tank.

3. The liquid fuel supply system according to claim 1, further comprising an air/liquid separation chamber disposed fluidly in series between an outlet of the electric pump and the air expulsion drain.

4. The liquid fuel supply system according to claim 3, wherein the liquid fuel supply system comprises a valve having a hydraulic fuse function, the valve being arranged fluidly in series between an outlet of the air/liquid separation chamber and the air expulsion drain, the valve being configured to close when liquid fuel enters the valve.

5. The liquid fuel supply system according to claim 4, wherein the valve is configured to close when a pressure difference between an upstream end of the valve, with reference to a direction of a stream of fuel through the liquid fuel supply system, and a downstream end of the valve is greater than a given threshold.

6. The liquid fuel supply system according to claim 1, further comprising a closing member extending in a duct forming a bypass between an air/liquid separation chamber and a filter with respect to the electric pump,
    the closing member being configured to allow communication between the air/liquid separation chamber and the filter when the electric pump is subjected to a pressure difference exceeding a given threshold.

7. The liquid fuel supply system according to claim 1, further comprising a checking device configured such that no gas or liquid can enter into the electric pump from a duct located downstream of the electric pump, with reference to a direction of a stream of fuel through the liquid fuel supply system, when the electric pump is stopped.

8. The liquid fuel supply system according to claim 7, further comprising:
    an air/liquid separation chamber arranged fluidly in series between an outlet of the electric pump and the air expulsion drain; and
    a valve having a hydraulic fuse function, the valve being arranged fluidly in series between an outlet of the air/liquid separation chamber and the air expulsion drain, the valve being configured to close when liquid fuel enters the valve,
    the checking device being separated from the valve.

9. The liquid fuel supply system according to claim 7, further comprising:
    an air/liquid separation chamber arranged fluidly in series between an outlet of the electric pump and the air expulsion drain; and
    a valve having a hydraulic fuse function, the valve being arranged fluidly in series between an outlet of the air/liquid separation chamber and the air expulsion drain, the valve being configured to close when liquid fuel enters the valve,
    the checking device being incorporated into the valve.

10. The liquid fuel supply system according to claim 1, wherein the electric pump is located at a highest point of a part of the fuel circuit extending upstream of the first supply pump with reference to a direction of a stream of fuel through the liquid fuel supply system.

11. An aircraft the aircraft comprising:
    an engine; and
    the liquid fuel supply system according to claim 1,
    wherein the liquid fuel supply system is configured for supplying fuel to the engine, and
    the engine comprises a high-pressure shaft configured to be rotationally driven by a combustion of the fuel and to drive the first supply pump.

12. The aircraft of claim 11, wherein the engine is a gas turbine engine.

13. The system according to claim 1,
    the system being configured for pumping fuel with the first fuel supply pump when the electric pump is stopped.

14. A method for supplying fuel to an aircraft engine, the method comprising:
    independently of a first fuel supply pump of the engine, the first fuel supply pump and the engine being stopped, pumping fuel, by an electric pump of the engine, from a tank located on board the aircraft, through a second fuel supply pump of the engine that is located upstream of the electric pump and expelling gas through an air expulsion drain, wherein the first fuel supply pump and the electric pump are each in communication with the tank independently; and
    independently of the electric pump, pumping fuel, by the first fuel supply pump, from the tank and supplying the engine.

* * * * *